United States Patent [19]

Shimamura

[11] Patent Number: 4,977,536

[45] Date of Patent: Dec. 11, 1990

[54] DOCUMENT PROCESSOR

[75] Inventor: Yoshiyuki Shimamura, Yokohama, Japan

[73] Assignee: Canon Kabushiki Kaisha, Tokyo, Japan

[21] Appl. No.: 511,939

[22] Filed: Apr. 16, 1990

Related U.S. Application Data

[63] Continuation of Ser. No. 805,715, Dec. 6, 1985, abandoned.

[30] Foreign Application Priority Data

Dec. 10, 1984 [JP] Japan ................................. 59-259302
Dec. 10, 1984 [JP] Japan ................................. 59-259303

[51] Int. Cl.⁵ .......................... G06F 7/24; G06F 11/00
[52] U.S. Cl. ..................................................... 364/900
[58] Field of Search ................................. 364/200, 900

[56] References Cited

U.S. PATENT DOCUMENTS

| 4,101,968 | 6/1978 | Florence ................. | 364/900 |
| 4,204,634 | 5/1980 | Barsuhn et al. ............. | 364/900 |
| 4,209,845 | 6/1980 | Berger et al. .............. | 364/900 |
| 4,250,560 | 2/1981 | Dethloff et al. ............ | 400/109 |
| 4,295,206 | 10/1981 | Cain et al. ................ | 364/900 |
| 4,464,730 | 8/1984 | Lawrence et al. ........... | 364/900 |
| 4,475,239 | 10/1984 | Van Raamsdonk ............ | 340/365 R |
| 4,491,933 | 1/1985 | Ursin et al. ............... | 364/900 |
| 4,495,490 | 1/1985 | Hopper et al. ............. | 340/709 |
| 4,608,662 | 8/1986 | Watanabe et al. ........... | 364/900 |
| 4,611,280 | 9/1986 | Linderman ................. | 364/300 |

FOREIGN PATENT DOCUMENTS

| 57-31040 | 2/1982 | Japan . | |
| 0162017 | 10/1982 | Japan ................................. | 364/900 |
| 58-14242 | 1/1983 | Japan ................................. | 340/709 |
| 48301 | 1/1983 | Japan ................................. | 340/709 |
| 48304 | 4/1983 | Japan ................................. | 340/709 |
| 48306 | 6/1983 | Japan ................................. | 340/709 |
| 146935 | 9/1983 | Japan . | |
| 166459 | 10/1983 | Japan . | |
| 6148064 | 3/1986 | Japan . | |
| 0112277 | 5/1986 | Japan . | |

Primary Examiner—Andrew J. James
Assistant Examiner—Viet Q. Nguyen
Attorney, Agent, or Firm—Fitzpatrick, Cella, Harper & Scinto

[57] ABSTRACT

A document processor comprises a memory for storing document information, a first information delimit member for delimiting the document information sequences stored in the memory into blocks, second document delimit member for dividing the document information sequences in the blocks into sort units, a sorter for sorting the document information sequences by the sort units, a sort order memory for storing a sort order of the sorter, and an arranger for rearranging the document information sequences in the blocks in accordance with the sort order stored in the sort order memory.

20 Claims, 12 Drawing Sheets

| | | | | | | |
|---|---|---|---|---|---|---|
| BSM { | BSM(1) | BSM(2) | ..... | ..... | BSM(i) | ..... |
| | ..... | ..... | | | | |
| SWM { | SWM(1) | SWM(2) | ..... | ..... | SWM(i) | ..... |
| SJM { | SJM(1) | SJM(2) | ..... | ..... | SJM(i) | ..... |
| | PNO ||| DS |||
| | CRLM ||| SS |||

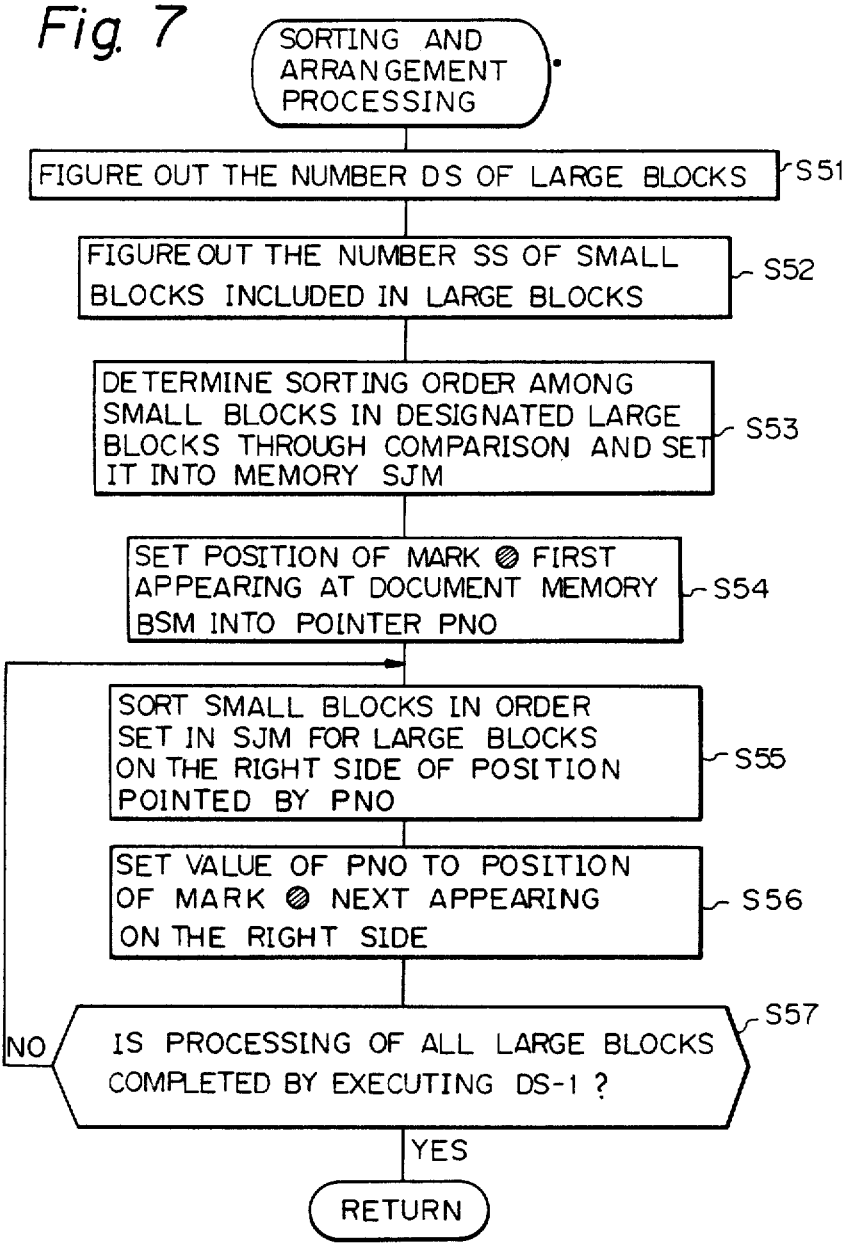

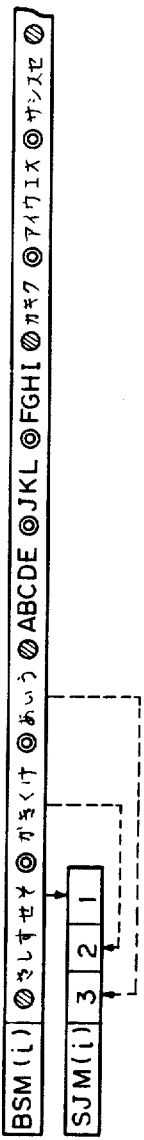
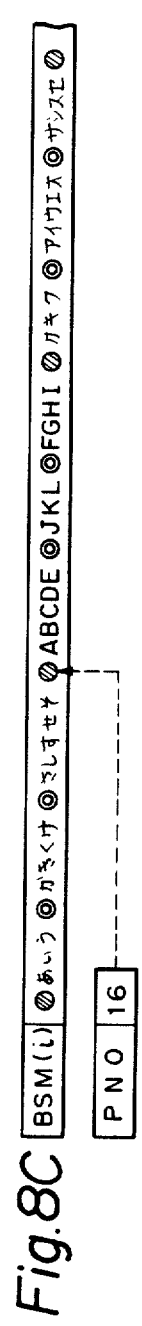
Fig.8A  Fig.8B  Fig.8C  Fig.8D

| BSM { | BSM(1) | BSM(2) | ..... | ..... | BSM(i) | ..... | 7A |
|---|---|---|---|---|---|---|---|
| | ..... | ..... | | | | | |
| SWM { | SWM(1) | SWM(2) | ..... | ..... | SWM(i) | ..... | |
| | PNO | | | | DS | | |
| | CRLM | | | | SSM | | |

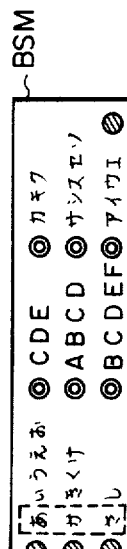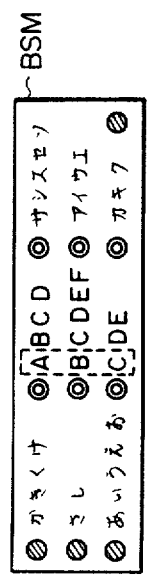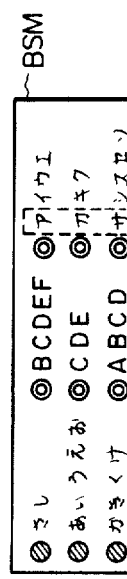

DOCUMENT PROCESSOR

This application is a continuation of application Ser. No. 805,715 filed Dec. 6, 1985, now abandoned.

BACKGROUND OF THE INVENTION

1. Field of the Invention

The present invention relates to a document processor, and more particularly to a document processor which divides document information into blocks and sort units and sorts them such that the arrangement of in the blocks follows an arrangement in one block.

2. Description of the Prior Art

A portable document processor having a one-line display has been becoming popular. In this type of processor, it would be convenient if character arrangement can be controlled in any manner. A conventional processor merely has a sort function and the number of characters in one line is predetermined as a sort unit and that number of characters are sorted line by line, or characters are sorted by a display character line. This is inconvenient to alter or edit the character arrangement.

SUMMARY OF THE INVENTION

It is an object of the present invention to provide a document processor having a tabling function, which divides document information into blocks of any length each of which comprises sort units, and sorts the blocks such that arrangements in the blocks follows a sequence in one of the sorted blocks.

It is another object of the present invention to provide a document processor which can divide and sort document information by sort unit of any length and sort element, independent of the number of characters in the document information and line concept.

It is other object of the present invention to provide a document processor which can easily process document arrangement sectioned in a line and column format and sort by column in a simple manner.

BRIEF DESCRIPTION OF THE DRAWINGS

FIG. 7 shows a flow chart of sort and arrangement processing of FIG. 6, FIGS. 8A to 8D show changes of contents of memories during the sort and arrangement processing.

DESCRIPTION OF THE PREFERRED EMBODIMENTS

Figure 1:
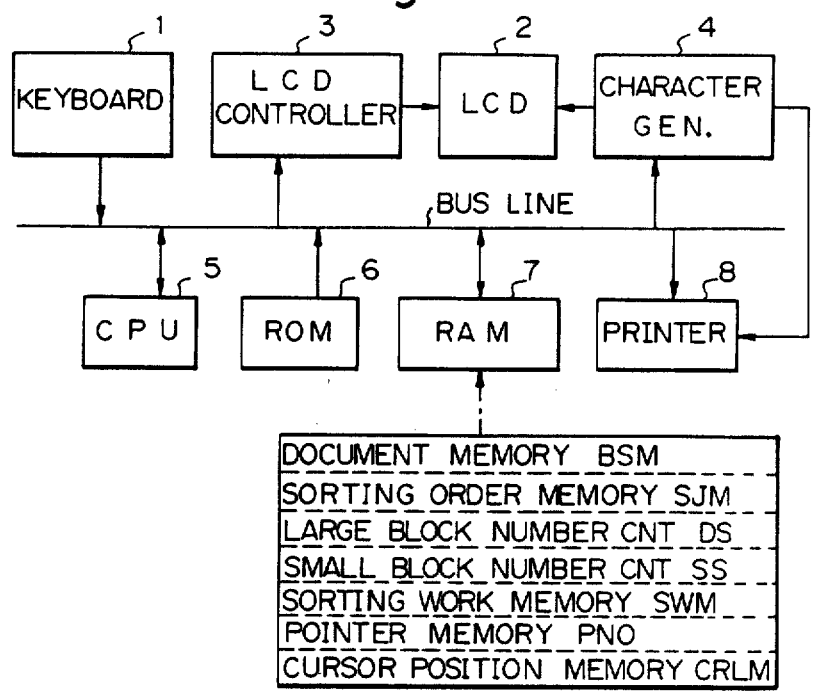
FIG. 1 is a block diagram of one embodiment of a document processor of the present invention.

FIG. 1 is a block diagram of one embodiment of the document processor of the present invention. Numeral 1 denotes a keyboard for inputting document information and processing commands, numeral 2 denotes a liquid crystal display (LCD) for displaying one line of document information, numeral 3 denotes a controller for the LCD 2, numeral 4 denotes a character generator which converts character codes to character patterns and supplies them to the LCD 2 or a printer, numeral 5 denotes a central processing unit (CPU) which primarily control the document processor, numeral 6 denotes a ROM which contains programs shown in FIGS. 6 and 7, numeral 7 denotes a RAM which temporarily stores various data necessary for processing, and numeral 8 denotes a printer for printing out document information.

The RAM 7 includes memory areas for a document memory BSM for storing document information, a large block counter DS which counts and holds the number of large blocks, a small block counter SS which counts and holds the number of small blocks in the large block, a sort work memory SWM for temporarily buffering a character sequence in a sort unit, a sort order memory SJM which stores a sort result and a sort order, a pointer memory PNO which stores and updates a sort start position when a sort program is executed, and a cursor position memory CRLM which indicates a cursor position on the document memory BSM.

Figure 2:
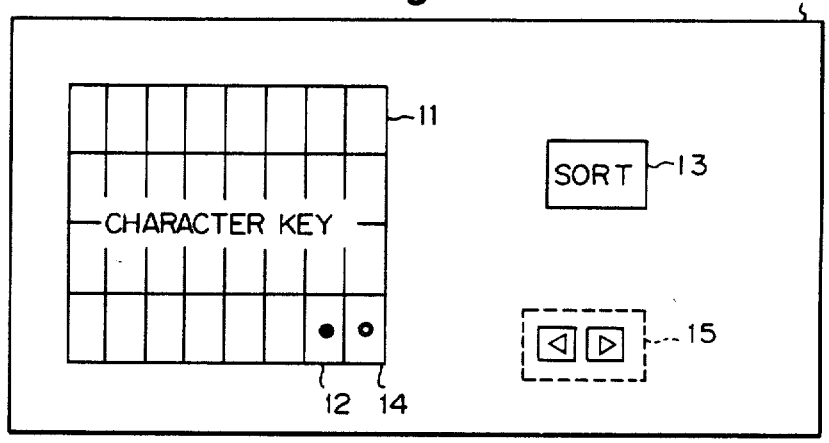
FIG. 2 is a top view of keyboard 1.

FIG. 2 shows a top view of the keyboard 1. Numeral 11 denotes character keys for inputting conventional document data. A character-code corresponding to a depressed key is stored in the document memory BSM and also displayed on the LCD 2. Numeral 12 in the character keys 11 denotes a mark key " " for dividing the document data into large blocks which are processing units, numeral 14 denotes a mark key " " for dividing the character sequence in the large block into small blocks which are sort units, numeral 13 denotes a sort key which starts a series of processing of sorting a selected block and rearranging the character arrangements in other blocks in accordance with the sort result of the selected block, and numeral 15 denotes a cursor key for shifting a cursor to left or right.

Figures 3, 4:
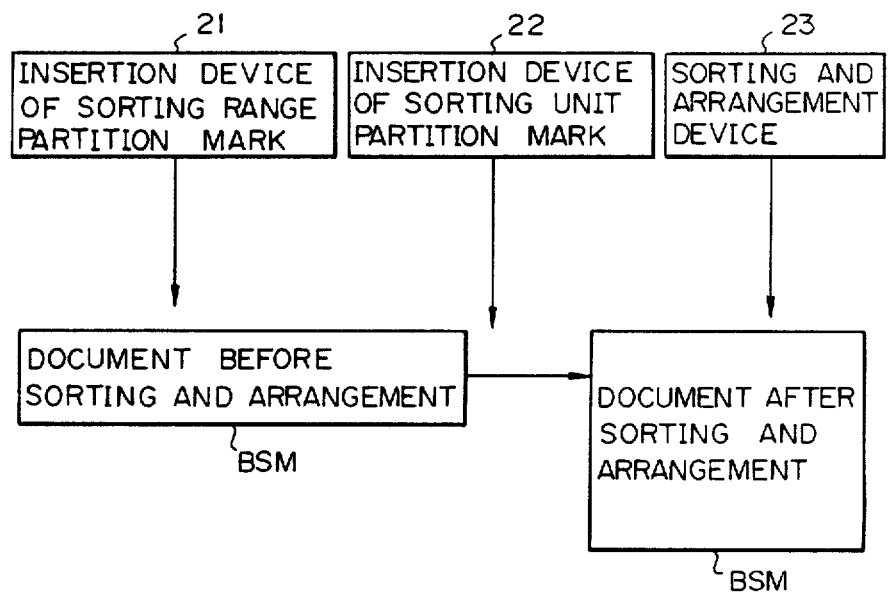
FIG. 3 shows a detail of a portion of a RAM 7.
FIG. 4 shows a functional configuration and processing of the embodiment of FIG. 1, FIGS. 5A to 5G show document sort and arrangement by the functional configuration of FIG. 4.

FIG. 3 shows a detail of a portion of the RAM 7. The document memory BSM stores therein the character information. It comprises BSM (1), BSM (2) . . . in the order of address. The character information at an address i is represented by BSM (i). The document memory BSM is a serial memory which stores the character information sequence by one-line concept for the purpose of sorting. Accordingly, for example, information codes such as a carriage return code, which are not subjects of sorting, are not stored therein. In another example, the information codes which are not subjects of sorting may be sorted in the document memory BSM as a conventional document memory does and such codes may be neglected during sorting. The sort work memory SWM is a serial memory which stores character information sequences in small blocks in one block which are to be moved for sorting are temporarily buffered. It comprises SMW (1), SWM (2), . . . in the order of address and character information at an address i is represente by SWM (i). The sort order memory SJM is a serial memory which stores, in a sort result order, the order of each sort unit before sorting of one block. It comprises SJM (1), SJM (2), . . . in the order of address and order information at an address i is represented by SJM (i). The pointer memory PNO stores positions of the marks " " and " " which divide the document data into large and small blocks, as the sort and arrange processing proceeds.

FIG. 4 shows a functional configuration and processing of the embodiment of FIG. 1. The document data in the document memory BSM is divided into large blocks by depressing the mark key 12 at a cursor position, and divided into small blocks (sort units) by depressing the mark key 14. This is shown by sort range delimit mark insert means 21 and sort unit delimit mark insert means 22 which insert the marks into the BSM. When the sort key 13 is next depressed, sort and arrange means 23 sorts and arranges the document data. The document memory BSM stores the sorted and arranged document data.

Figures 5A, 5B, 5C, 5D, 5E, 5F, 5G:
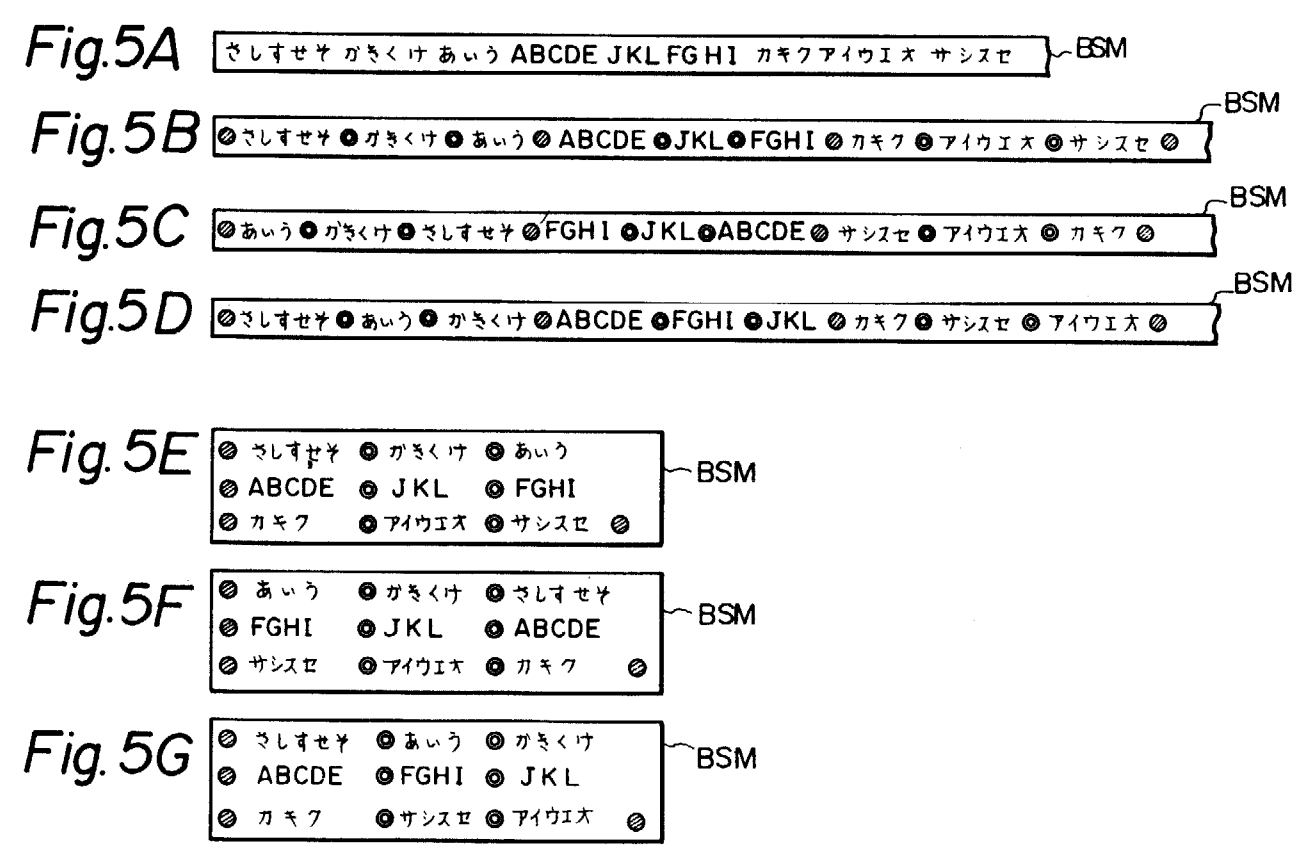

FIGS. 5A to 5G show document sorting and arrangement by the functional configuration of FIG. 4. As shown in FIG. 5A, a character sequence is input into the document memory BSM in one-line concept, and it is divided into large blocks and small blocks by the mark keys 12 and 14. Alternatively, the mark keys 12 and 14 may be depressed during the input of the character sequence. The mark " " functions to delimit the sort and arrange the range of the document data, and the mark " " functions to delimit the sort unit of the character sequence. The character sequence delimited by the marks " " is defined as the large block, and the character sequence delimited by the marks " " is defined as the small block. Then, a cursor is moved to any position in the first large block and the sort key 13 is depressed. Thus, the sort and arrange means 23 compares the magnitudes of the small blocks in the large block to sort the small blocks, and arranges the character sequences of other blocks in accordance with the sorted sequence in the first block. The result is shown in FIG. 5C. The numbers of characters in the sort units may be different from each other. If there is no corresponding characters in the sort unit to be compared because of unequal numbers of characters, the compare decision may be always larger or smaller. When the sort key 13 is depressed while the cursor is in the second large block of FIG. 5B, the sort and arrange result shown in FIG. 5D is obtained. In FIGS. 5E to 5G, the character sequences shown in FIG. 5B to 5D are rearranged so that the large blocks are arranged in line and the small blocks are arranged in columns.

Figure 6:
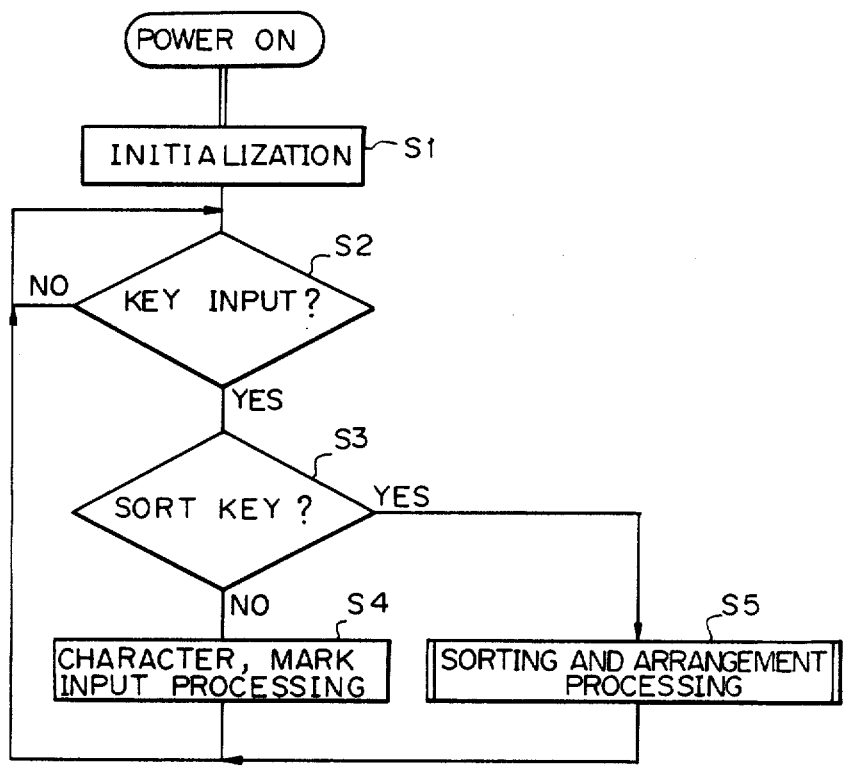
FIG. 6 shows a flow chart of processing of a CPU 5 of FIG. 1.

FIGS. 6 and 7 show flow charts of processing of the CPU 5 in the embodiment of FIG. 1. FIG. 8 shows changes of contents of the memories during the sort and arrange processing of FIG. 7. The operation is now explained with reference to those drawings.

When the processor is powered on, a step S1 of FIG. 6 is executed to initialize the processor. The document memory BSM, sort work memory SWM and sort order memory SJM are cleared, and the cursor position memory CRLM is initialized to display the cursor at a predetermined position. In a step S2, a key entry from the keyboard 1 is watched, and if the key entry is detected, whether it is from the sort key or not is checked in a step S3. If it is not from the sort key, a step S4 is carried out to execute a conventional character key processing. The keyed-in character is stored in the document memory BSM at an address corresponding to the cursor position memory CRLM, and then the cursor is advanced by one step. The same operation is carried out for the mark keys 12 and 14. If the decision in the step S3 indicates the sort key, a step S5 is carried out to sort and arrange the document memory.

FIG. 7 shows a flow chart of the sort and arrange processing of FIG. 6. In a step S51, the number of large blocks is determined based on the number of marks " " in the document memory BSM, and it is set into the large block counter DS in the RAM area. In a step S52, the number of small blocks in one large block is determined based on the number of marks " " between the marks " ", and it is set into the small block counter SS. In a step S53, the small blocks (sort units) in the large block on the document memory BSM designated by the content of the CRLM are compared by their first characters, and if they are equal, compared by their second characters and so on to determine a minimum small block. The block number of the minimum small block is stored in the sort order memory SJM (1). The status of the document memory BSM and the sort order memory SJM at this moment is shown in FIG. 8A. For example, " ", " " and " " are compared. Since the third small block " " is minimum, "3" is set into the SJM (1). Similarly, "2" for " " is set into the SJM (2), and "1" for " " is set into the SJM (3).

In a step S54, the position of the mark " " first appearing in the document memory BSM is set into the pointer memory PNO. This is shown in FIG. 8B. In a step S55, the small blocks in the large blocks which are on the right side (larger address side) of the position indicated by the pointer PNO are sorted (arranged) to follow the order stored in the sort order memory SJM. The character sequence in the sort unit is temporarily buffered in the sort work memory SWM and then written into the document memory BSM, and the above operation is repeated so that the character sequences are rearranged by sort unit. The rearranged first large block is shown in FIG. 8C. In a step S56, the position of the mark " " for the next large block is set into the pointer memory PNO. This is shown in FIG. 8C. In a step S57, the content of the large block counter DS is decremented by one because one large block has been sorted (arranged) so far, and whether the content of the large block counter DS is equal to "1" or not is checked. If it is not "1", the process returns to the step S55 and the above operation is repeated until the count of the large block counter DS reaches "1". When the operation is completed, the sorting (arrangement) is completed. The data in the document memory BSM is shown in FIG. 8D.

In the present embodiment, the blocks are sorted in the order starting from the minimum character, although they may be sorted in the order starting from a maximum character. Alternatively, they may be sorted in the descending order or ascending order of the number of characters.

The sort key 13 is used to sort the blocks in the present embodiment. Alternatively, a SORT command may be entered by the character keys.

Figure 9:
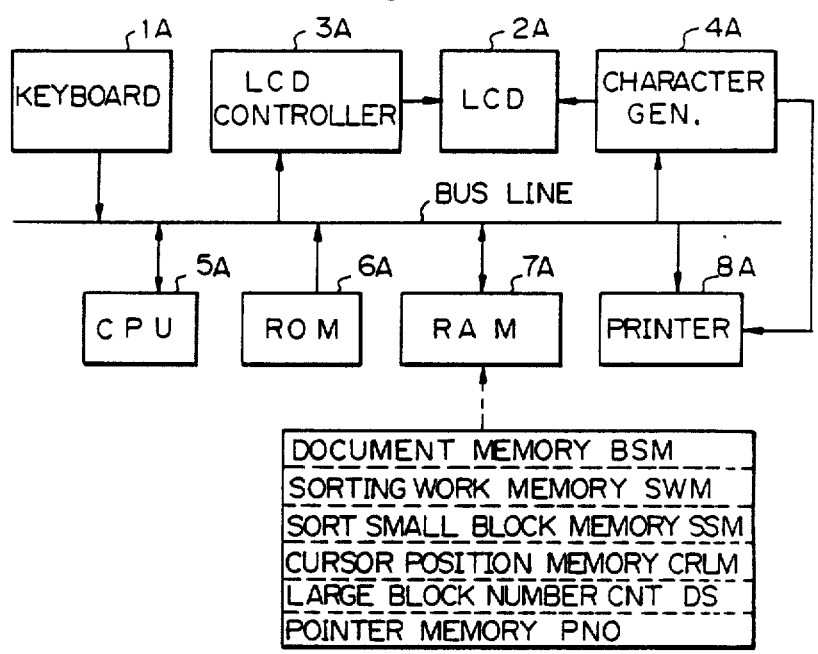
FIG. 9 is a block diagram of another embodiment of the document processor of the present invention.

FIG. 9 is a block diagram of another embodiment of the document processor of the present invention. Numeral 1A denotes a keyboard for inputting document information and processing commands, numeral 2A denotes a liquid crystal display (LCD) for displaying one line of document information, numeral 3A denotes a controller for the LCD 2A, numeral 4A denotes a character generator which converts character codes to character patterns and supplies them to the LCD 2A or a printer, numeral 5A denotes a central processing unit (CPU) which primarily control the document processor, numeral 6A denotes a ROM which contains programs shown in FIGS. 6 and 7, numeral 7A denotes a RAM which temporarily stores various data necessary for processing, and numeral 8A denotes a printer for printing out document information.

The RAM 7A includes memory areas for a document memory BSM for storing document information, a large block counter DS which counts and holds the number of large blocks, a sort work memory SWM for temporarily buffering a character sequence in a sort unit, a pointer memory PNO which stores and updates a sort start position when a sort program is executed, and a cursor position memory CRLM which indicates a cursor position on the document memory BSM.

Figure 10:
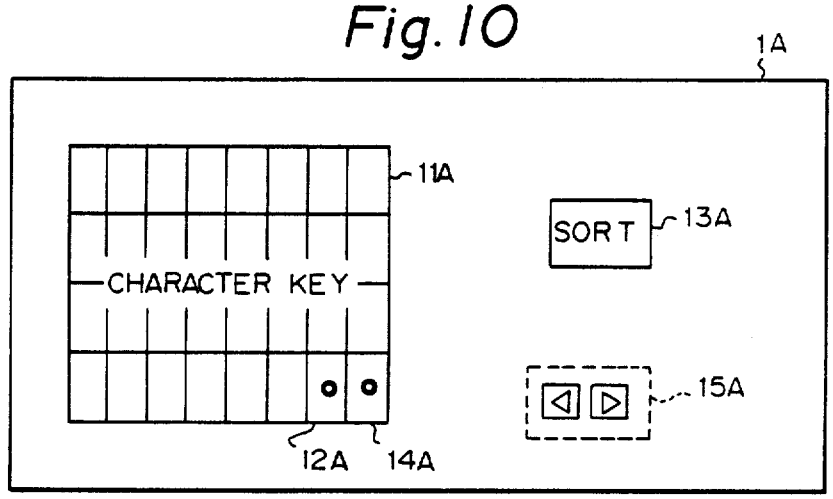
FIG. 10 is a top view of a keyboard 1.

FIG. 10 shows a top view of the keyboard 1A. Numeral 11A denotes character keys for inputting conventional document data. A character code corresponding to a depressed key is stored in the document memory BSM and also displayed on the LCD 2A. Numeral 12A in the character keys 11A denotes a mark key " " for dividing the document data into large blocks which are processing units, numeral 14A denotes a mark key " " for dividing the character sequence in the large block into small blocks which are sort units, numeral 13A denotes a sort key which starts sorting of the serial character sequences in the large block, and numeral 15A denotes a cursor key for shifting a cursor to left or right.

Figures 11, 12:
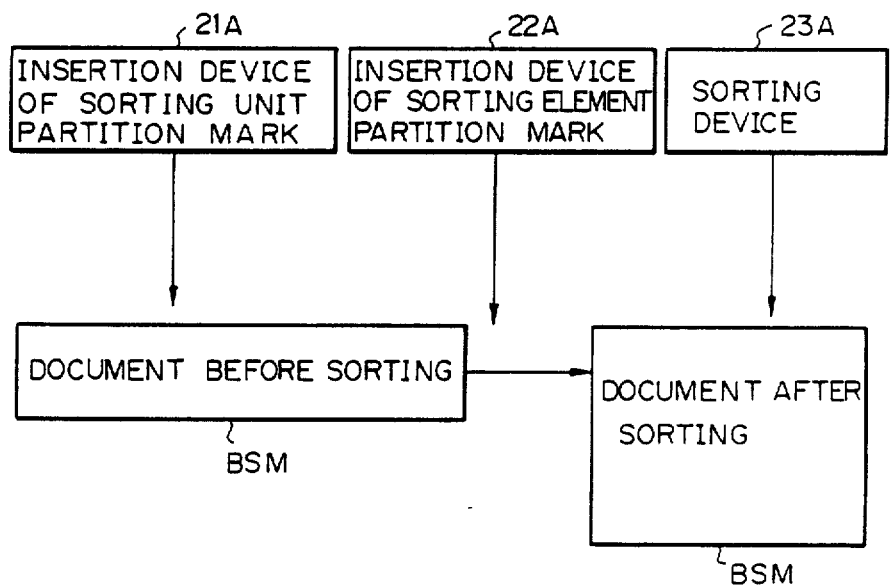
FIG. 11 shows a detail of a portion of a RAM 7.
FIG. 12 shows a functional configuration and processing of the embodiment of FIG. 9, FIGS. 13A to 13G show document sorting by the functional configuration of FIG. 12.

FIG. 11 shows a detail of a portion of the RAM 7A. The document memory BSM stores therein the character information. It comprises BSM (1), BSM (2), ... in the order of address. The character information at an address i is represented by BSM (i). The document memory BSM is a serial memory which stores the character information sequence by one-line concept for the purpose of sorting. Accordingly, for example, information codes such as a carriage return code, which are not subjects of sorting, are not stored therein. In another example, the information codes which are not subjects of sorting may be stored in the document memory BSM as a conventional document memory codes and such codes may be neglected during sorting. The sort work memory SWM is a serial memory which stores character information sequences in small blocks in one block which are to be moved for sorting are temporarily buffered. It comprises SWM (1), SWM (2), ... in the order of address and character information at an address i is represented by SWM (i). The pointer memory PNO stores positions of the marks " " which divide the document data into large blocks, as the sort processing proceeds.

FIG. 12 shows a functional configuration and processing of the embodiment of FIG. 9. The document data in the document memory BSM is divided into large blocks by depressing the mark key 12A at a cursor position, and divided into small blocks (sort units) by depressing the mark key 14A. This is shown by sort range delimit mark insert means 21A and sort unit delimit mark insert means 22A which insert the marks into the BSM. When the sort key 13A is next depressed, sort means 23A sorts and arranges the document data. The document memory BSM stores the sorted and arranged document data.

FIGS. 13A to 13B show document sorting and arrangement by the functional configuration of FIG. 12.

As shown in FIG. 13A, a character sequence is input in the document memory BSM in one-line concept, and it is divided into large blocks and small blocks by the mark keys 12A and 14A. Alternatively, the mark keys 12A and 14A may be depressed during the input of the character sequence. The mark " " functions to delimit the sort and arrange range of the document data, and the mark " " functions to delimit the sort unit of the character sequence. The character sequence delimited by the marks " " is defined as the large block, and the character sequence delimited by the marks " " is defined as the small block. Then, a cursor is moved to any position in the first large block, for example, at the second sort element CDE and the sort key 13A is depressed. Thus, the sort means 23A compares the magnitudes of the second small blocks in the large blocks on the right side of the cursor to sort the small blocks for each large block. The result is shown in FIG. 13C. The numbers of characters in the sort units may be different from each other. If there is no corresponding characters in the sort unit to be compared because of unequal number of characters, the compare decision may be always larger or smaller. When the sorting is done by the third element in the first block of FIG. 13B, the sort result shown in FIG. 13D is obtained. In FIGS. 13E-13G, the character sequences shown in FIGS. 13B-13D are shown by a line-and-column concept. In FIG. 13E, the character sequences are column-sorted in the order of " ", in FIG. 13F, they are column-sorted in the order of "ABC", and in FIG. 13B, they are column-sorted in the order of " ".

Figure 14:
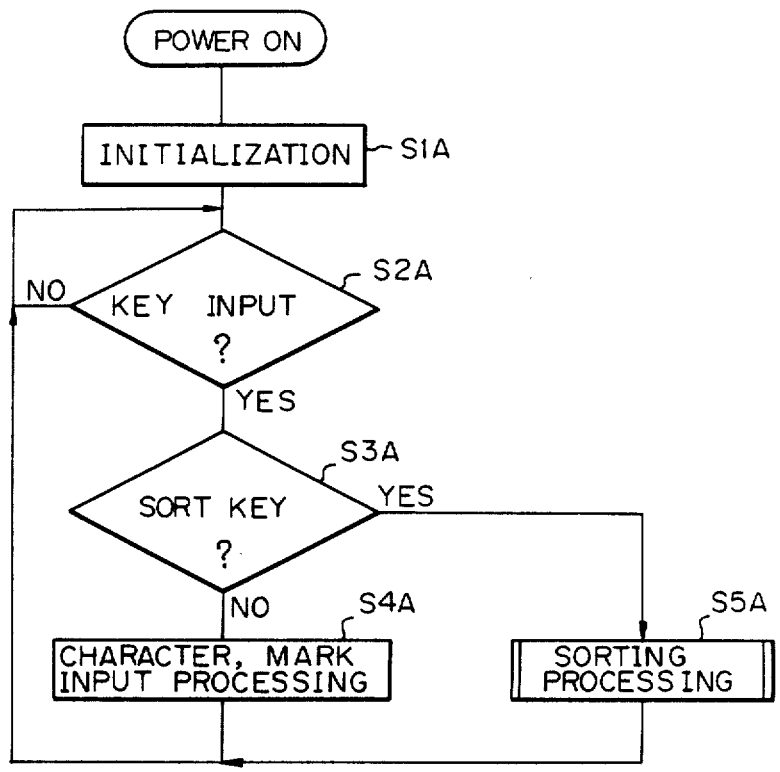
FIG. 14 shows a flow chart of processing of a CPU 5 of FIG. 9.
Figure 15:
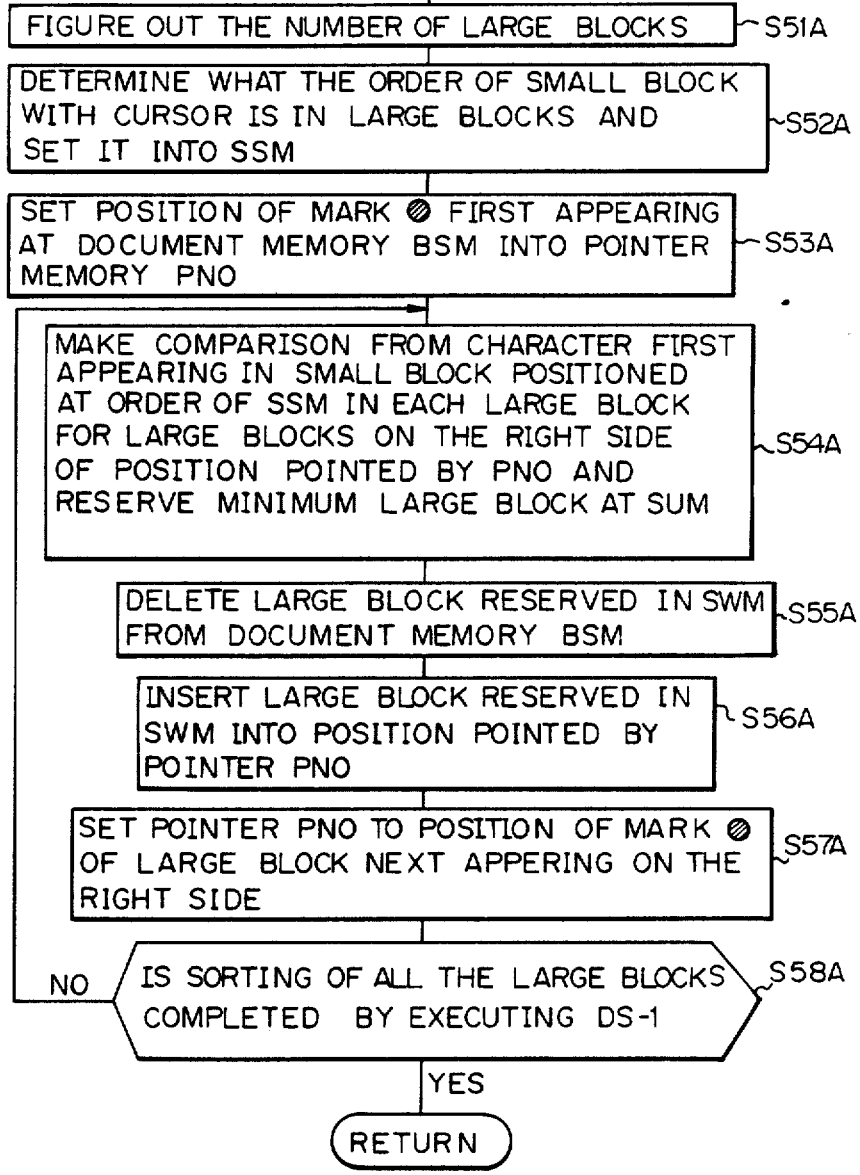
FIG. 15 shows a flow chart of sort processing in FIG. 14, and FIGS. 16A to 16D show changes in contents of memories during the sort processing.

FIGS. 14 and 15 shown flow charts of processing of the CPU 5 in the embodiment of FIG. 9. FIG. 16 shows changes of contents of the memories during the sort processing of FIG. 15. The operation is now explained with reference to those drawings.

When the processor is powered on, a step S1A of FIG. 14 is executed to initialize the processor. The document memory BSM and sort work memory SWM are cleared, and the cursor position memory CRLM is initialized to display the cursor at a predetermined position. In a step S2A, a key entry from the keyboard 1 is watched, and if the key entry is detected, whether it is from the sort key or not is checked in a step 33A. If it is not from the sort key, a step S4A is carried out to execute a conventional character key processing. The keyed-in character is stored in the document memory BSM at an address corresponding to the cursor position memory CRLM, and then the cursor in advanced by one step. The same operation is carried out for the mask keys 12A and 14A. If the decision in the step S3A indicates the sort key, a step S5A is carried out to sort the document memory BSM.

Figure 16A:
Figure 16B:
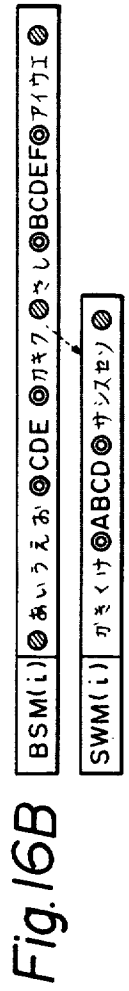
Figure 16C:
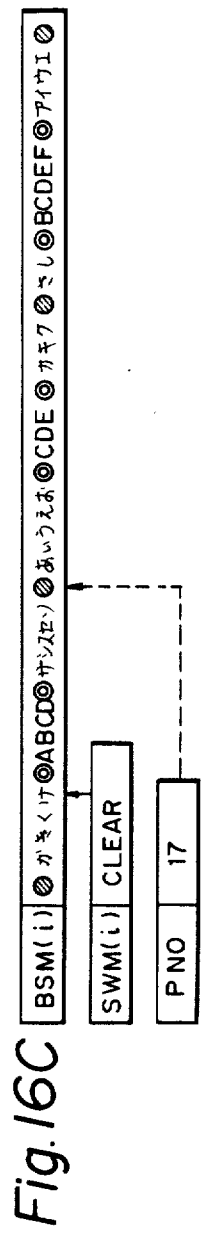
Figure 16D:

FIG. 15 shows a flow chart of the sort processing of FIG. 14. In a step S51A, the number of large blocks is determined based on the number of marks " " in the document memory BSM, and it is set into the large block counter DS in the RAM area. In a step S52A, the cursor position memory CRLM is referenced to determine the small block number in the large block pointed by the cursor and it is set into the sort small block memory SSM in the RAM area. In a step S53A, the position of the mark " " first appearing in the document memory BSM is set into the pointer memory PNO. This is shown in FIG. 16A. In a step S54A, the first character of the small block numbers stored in the SSM for those large blocks which are on the right side (larger address side) of the position indicated by the pointer PNO are compared, and if they are equal, the second characters are compared and so on to determine the large block which includes the minimum sort element. The selected large block is stored in the sort work memory SWM. In a step S55A, the large block held in the sort work memory SWM is deleted from the document memory BSM. The status of the document memory BSM and the sort work memory at this moment is shown in FIG. 16B. In a step S56A, the large block held in the sort work memory SWM is written into the document memory BSM at the address indicated by the pointer memory PNO and the SWM is cleared. In a step S57A, the position of the mark " " for the next large block is set into the pointer memory PNO. This is shown in FIG. 16C. In a step S58A, the content of the large block counter DS is decremented by one because one large block has been sorted so far, and whether the contents of the large block counter DS is equal to "1" or not is checked. If it is not "1", the process returns to the step S54A and the above operation is repeated until the count of the large block counter DS reaches "1". When the operation is completed, the sorting is completed. The data in the document memory BSM is shown in FIG. 16D.

In the present embodiment, the blocks are sorted in the order starting from the minimum character. Although they may be sorted in the order starting from a maximam character. Alternatively, they may be sorted in the descending order or ascending order of the number of characters.

In the present embodiment, the sort element is designated by moving the cursor to the character sequence of the sort element, although the numeric key may be used to designate the element number to be used for sorting.

The sort key 13A is used to sort the blocks in the present embodiment. Alternatively, a SORT command may be entered by the character keys.

In accordance with the present invention, any document information can be sorted by dividing it into sort units and sort elements of any lengths independently from the concept of line and the number of characters of the document information.

In accordance with the present invention, the document arranged in lines and columns can be readily processed and can be simply column-sorted.

What I claimed is:

1. Information processing apparatus comprising:
    memory means for storing a sequence of character information and discrimination information to be used for discriminating the sequence of character information;
    indication means for indicating the sequence of character information stored in said memory means in a first character array format;
    discrimination means, connected to said memory means for discriminating the sequence of character information stored in said memory means in accordance with the discrimination information; and
    sort means responsive to the discriminating by said discrimination means for sorting the sequence of character information in the first character array format and for storing in said memory means the sorted sequence of character information in a second character array format different from the first character array format, wherein the sequence of character information to be sorted is a sequence of character information discriminated with the discrimination information.

2. Information processing apparatus according to claim 1, further comprising format input means for inputting character array format information that determines the array format of the sequence of character information.

3. Information processing apparatus according to claim 2, wherein said memory means is connected to said format input means and stores the character array format information with the sequence of character information.

4. Information processing apparatus according to claim 3, further comprising character input means for inputting the sequence of character information.

5. Information processing apparatus according to claim 3, further comprising keyboard input means which includes said character input means and said format input means.

6. Information processing apparatus comprising:
    memory means for storing a sequence of character information and discrimination information to be used for discriminating the sequence character information;
    indication means for indicating the sequence of character information stored in said memory means in a first character array format;
    discrimination means, connected to said memory means, for discriminating the sequence of character information stored in said memory means, in accordance with the discrimination information; and
    sorting means responsive to the discriminating by said discrimination means for sorting the sequence of character information in the first character format and for storing in said memory means the sorted sequence of character information in a second character array format different from the first character array format, wherein the sequence of character information to be sorted is the sequence of character information discriminated in accordance with the discrimination information.

7. Information processing apparatus according to claim 6, further comprising format input means for inputting format information that determines the array format of the sequence of character information.

8. Information processing apparatus according to claim 6, further comprising character input means for inputting the sequence of character information.

9. Information processing apparatus according to claim 6, further comprising format input means for inputting format information that determines the array format of the sequence of character information, and character input means for inputting the sequence of character information.

10. Information processing apparatus according to claim 9 further comprising keyboard input means which includes said character input means and said format input means.

11. Information processing apparatus comprising:
    memory means for storing a sequence of character information input in a first character array format and discrimination information to be used for discriminating the sequence of character information;
    discrimination means, connected to said memory means, for discriminating the sequence of character information stored in said memory means in accordance with the discrimination information; and
    sorting means responsive to the discriminating by said discrimination means for sorting the sequence of character information in a first character format and for storing in said memory means the sorted sequence of character information a second character array different from the first character array.

12. Information processing apparatus according to claim 11, further comprising format input means for inputting character array format information that determines the array format of the sequence of character information.

13. Information processing apparatus according to claim 11, further comprising character input means for inputting the sequence of character information.

14. Information processing apparatus according to claim 13, further comprising format input means for inputting format information that determines the array format of the sequence of character information, and character input means for inputting the sequence of character information.

15. Information processing apparatus according to claim 14, further comprising keyboard input means which includes said character input means and said format input means.

16. Information processing apparatus according to claim 12, wherein the character array format information inputted by said format input means is stored in said memory means.

17. Information processing apparatus comprising:
format input means for inputting character array format information which determines the array format of a sequence of character information;
memory means for storing the sequence of character information and the array format information;
discrimination means, connected to said memory means, for discriminating the sequence of character information stored in said memory means in accordance with the array format information; and
sorting means responsive to the discriminating by said discrimination means for sorting the sequence of character information in a matrix array format.

18. An information processing apparatus comprising;
memory means for storing a character information sequence;
format input means for inputting character arrangement format information which determines the character format arrangement of the character information sequence, said format input means inputting character arrangement format information into the character information sequence;
discrimination means, connected to said memory means, for discriminating the character information sequence stored in said memory means in accordance with the character arrangement format information; and
means for sorting the character information sequence in a matrix array arrangement which represents a matrix in response to a discriminating by said discrimination means.

19. An information processing apparatus comprising:
memory means for storing a character information sequence and the character arrangement format information.
format input means for inputting character arrangement format information into the character information sequence, said character arrangement format information determining the character format arrangement of the character information sequence;
display means for displaying the character information sequence stored in said memory means in a first character arrangement format;
discrimination means, connected to said memory means, for discriminating the character information sequence stored in said memory means in accordance with the character arrangement format information; and
sorting means for sorting the character information sequence in the first character arrangement format and in a second character arrangement format in response to the discriminating by said discrimination means.

20. An information processing apparatus comprising:
memory means for storing a character information sequence and the character arrangement format information;
format input means for inputting character arrangement format information into the character information sequence, said character arrangement format information determining the character format arrangement of the character information sequence;
display means for displaying the character information sequence stored in said memory means in a first character arrangement format;
discrimination means, connected to said memory means, for discriminating the character information sequence stored in said memory means in accordance with the character arrangement format information; and
sorting means for sorting the character information sequence in a second character arrangement format different from the first character arrangement format in response to the discriminating by said discrimination means.

* * * * *

UNITED STATES PATENT AND TRADEMARK OFFICE
CERTIFICATE OF CORRECTION

PATENT NO. : 4,977,536

DATED : December 11, 1990

INVENTOR(S) : Yoshiyuki SHIMAMURA

It is certified that error appears in the above-identified patent and that said Letters Patent is hereby corrected as shown below: ON TITLE PAGE:

AT [56] REFERENCES CITED:

"4,101,968 6/1978 Florence" should read
--4,101,968 7/1978 Florence--.

"6148064 3/1986 Japan" should read
--61 - 48064 3/1986 Japan--.

FIGURE 15:

Step S57A, "APPERING" should read --APPEARING--.

COLUMN 1:

Line 12, "in" should be deleted.

COLUMN 2:

Line 37, "character-code" should read
--character code--.

Line 40, "key" "" should read --key " • "--.

Line 42, "key" "" should read --key "ⓒ"--.

Line 61, "sorted" should read --stored--.

UNITED STATES PATENT AND TRADEMARK OFFICE
CERTIFICATE OF CORRECTION

PATENT NO. : 4,977,536
DATED : December 11, 1990
INVENTOR(S) : Yoshiyuki SHIMAMURA It is certified that error appears in the above-identified patent and that said Letters Patent is hereby corrected as shown below:

COLUMN 3:

Line 7, "marks" " and " " " should read
    --marks " ● " and "◎"--.

Line 28, "mark" " " should read -- mark
    "●"--.

Line 30, "mark" "   should read --mark "◎"--.

Line 32, "marks"   "" should read --marks "●"--.

Line 33 "marks"   "" should read --marks "◎"--.

COLUMN 4

Line 8, "marks"    " " should read --marks "●"--.

Line 12, "marks"   " " should read --marks "◎"--.

Line 13, "marks"   "," should read --marks "●".

UNITED STATES PATENT AND TRADEMARK OFFICE
CERTIFICATE OF CORRECTION

PATENT NO. : 4,977,536          Page 3 of 5
DATED     : December 11, 1990
INVENTOR(S) : Yoshiyuki SHIMAMURA It is certified that error appears in the above-identified patent and that said Letters Patent is hereby corrected as shown below:

COLUMN 4 (continued):

Line 27 "mark" " " should read --mark " ● "--.

Line 40 "mark" " " should read --mark " ● "--.

COLUMN 5

Line 23, "key" ", " should read --key " ● ",--.

Line 25, "key" ", " should read --key " ⓒ ",--.

Line 52, "marks" " should read --marks "●"--.

COLUMN 6

Line 6, "mark" " " should read --mark "●"--;

UNITED STATES PATENT AND TRADEMARK OFFICE
CERTIFICATE OF CORRECTION

PATENT NO. : 4,977,536

DATED : December 11, 1990

INVENTOR(S) : Yoshiyuki SHIMAMURA

It is certified that error appears in the above-identified patent and that said Letters Patent is hereby corrected as shown below:

COLUMN 6 (continued):

Line 8, "mark" " " should read --mark "◉"--.

Line 10, "marks" " " should read --marks "●"--.

Line 11, "marks" " " should read --marks "◉"--.

Line 14, "element    CDE    " should read --element ◉CDE◉ --.

Line 44, "Step 33A." should read --Step S3A.--.

Line 56, "marks" " " should read --marks "●"--.

Line 63, "mark" " " should read --mark "●"--.

UNITED STATES PATENT AND TRADEMARK OFFICE
CERTIFICATE OF CORRECTION

PATENT NO. : 4,977,536
DATED : December 11, 1990
INVENTOR(S) : Yoshiyuki SHIMAMURA It is certified that error appears in the above-identified patent and that said Letters Patent is hereby corrected as shown below:

COLUMN 7:

Line 13, "mark" " " should read --mark "●"--.

Line 46, "claimed" should read --claim--.

COLUMN 8:

Line 54, "claim9" should read --claim 9,--.

COLUMN 9:

Line 2, "information" should read --information in--.

Line 41, "comprising ;" should read --comprising:--.

COLUMN 10:

Line 10, "information." should read --information.--.

Signed and Sealed this

Fourth Day of August, 1992

Attest:

DOUGLAS B. COMER

Attesting Officer     Acting Commissioner of Patents and Trademarks